STUART PERRY.

Improvement in Horse Power Jacks.

No. 122,488.

Patented Jan. 2, 1872.

Witnesses:

Inventor:
Stuart Perry.
By atty. A.B. Stoughton.

UNITED STATES PATENT OFFICE.

STUART PERRY, OF NEWPORT, NEW YORK.

IMPROVEMENT IN HORSE-POWER JACKS.

Specification forming part of Letters Patent No. 122,488, dated January 2, 1872.

*To all whom it may concern:*

Be it known that I, STUART PERRY, of Newport, in the county of Herkimer and State of New York, have invented certain new and useful Improvements in Horse-Power Jacks; and I do hereby declare the following to be a full, clear, and exact description of the same, reference being had to the accompanying drawing making a part of this specification, in which—

Figure 1:
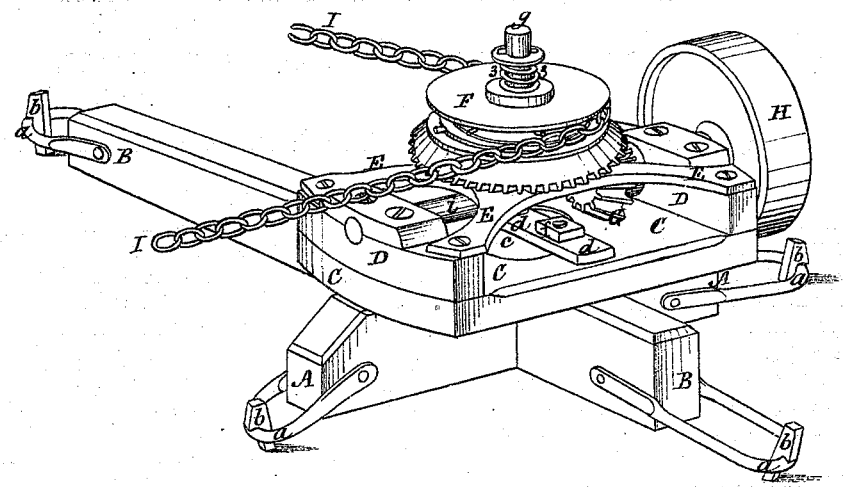
Figure 2:
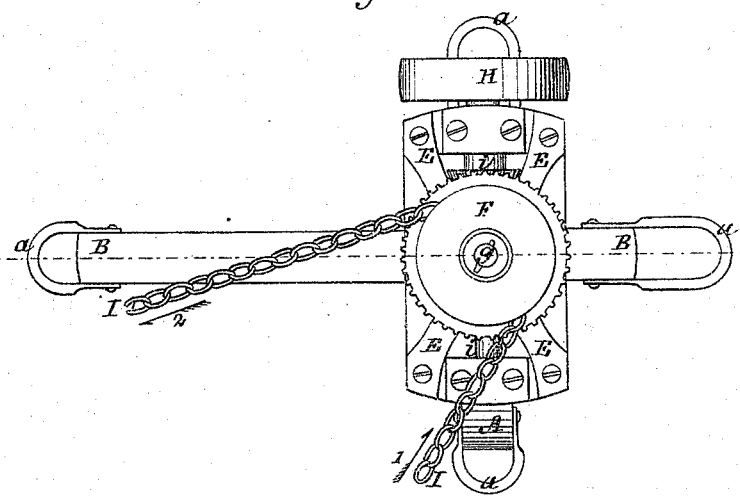
Figure 3:
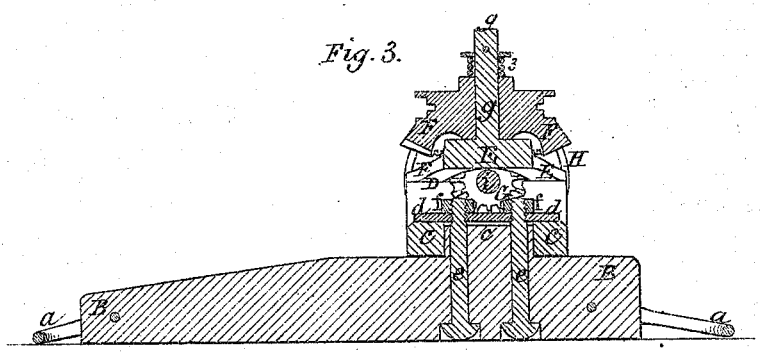

Figure 1 represents the jack, with a portion of the chain coming in from the horse-power shown on it. Fig. 2 represents a top plan of the same; and Fig. 3 represents a vertical central section through the same taken at the dotted line in Fig. 2.

Similar letters of reference, where they occur in the separate figures, denote like parts of the structure in the drawing.

My invention consists: First, in the swivel arrangement of the chain-wheel upon the jack-frame, by which the force communicated to the jack of a circuit-chain horse power, by the chain connecting the horse-wheel and jack, can be transmitted in a variety of directions without the necessity of unstaking from the ground any part of the machine; and my invention further consists in constructing the ground-frame of circuit-chain horse-power jacks of a cruciform, so that the said frame may be firmly staked and held to the ground against the force applied to and through the upper frame, the incoming power applied through the chain coming in the direction of the head of the cross, and the outgoing of the chain being in the direction of the long arm of the cross.

To enable others skilled in the art to make and use my invention, I will proceed to describe the same with reference to the drawing.

The ground frame is composed of a head, A, and a long arm, B, suitably framed or fastened together in the form of a cross, and at the ends of said pieces are secured straps or loops $a\ a\ a\ a$, by or through which said frame may be firmly held to the ground by means of stakes $b$, as shown in Fig. 1. At the line of intersection of the two pieces A B there is a hub, journal, or other suitable turning and holding device, $c$, over or upon which the base C of the jack-frame is placed, and upon or around which said jack-frame may turn, when so desired. Upon this base-piece C, and extending over the hub $c$ and across the opening in the base-piece that receives said hub, there is a plate, $d$, through the ends of which and through the long arm B of the ground frame, are passed the clamping-bolts $e\ e$, which have nuts $f$ thereon, conveniently placed for being easily operated when the jack-frame is to be adjusted upon the ground-frame. Upon the pillar-blocks D on the base C of the jack-frame is fastened the bridge E, in which is placed and fastened the stem or journal $g$, upon which the chain-wheel F of the jack is placed and turns. The under side of the chain-wheel F is furnished with bevel-teeth or gears, which take into and turn the pinion G, which is fastened on the shaft $i$, said shaft passing underneath the bridge E, and having its bearings in or on the pillar-blocks D; and one end of this shaft extends beyond its support, and has upon it a band or belt-pulley, H, for conveying the power to any machine that is to be driven by it; and instead of a pulley and band, the ordinary well-known tumbling-shaft may be used. I represents a chain, which extends from the horse-wheel of any ordinary circuit horse-power, and passes partially around the chain-wheel F, so as to catch upon, turn, and then readily leave said wheel; the incoming part of the chain being shown by the arrow marked 1, and the outgoing part of the chain being shown by the arrow marked 2. Over the top of the chain-wheel there is a spring, 3, to allow said wheel to rise out of gear with the pinion should the strain from any cause become excessive, and thus prevent breakage.

It will be perceived that the incoming chain, or power coming upon the chain-wheel, is in the direction of the head A of the ground-frame, and that the outgoing chain moves in the direction of the long arm B of said ground-frame, as shown by the arrows; and the tendency of this strain is to lift the head of the cross over the other end of the long arm; and as this head is held to the ground by three stake it is obvious that it can be much more firm s held to the ground when in the form mentioned than by any other form that would differently dispose of the stakes or take them away from the point of greatest strain.

The advantage of swiveling the jack-frame, or making the former adjustable upon the latter, is that the belt or tumbling-rod can be set exactly in the right direction with regard to the machine to be run by the power without disturbing the stakes, and then fastened there.

What I claim is—

The swivel or adjustable arrangement of the jack upon the ground-frame so that the force communicated to the jack by the chain connecting the horse-wheel and jack can be transmitted in a variety of directions without the necessity of unstaking from the ground any part of the machine, as described and represented.

I also claim constructing the ground-frame of the jack of a circuit-chain horse-power in the form of a cross, as and for the purpose described and represented.

STUART PERRY.

Witnesses:
JOHN G. BARRY,
GEO. H. HURLBERT. (79)